Figure 1:
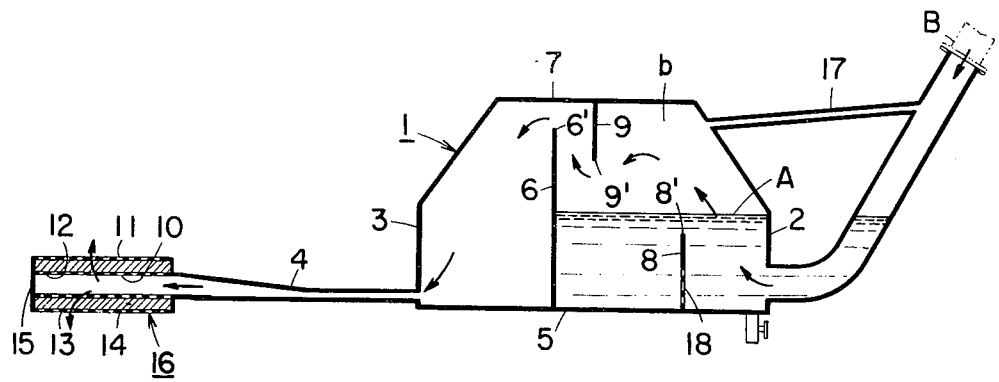

United States Patent [19]

Terao

[11] 3,967,941

[45] July 6, 1976

[54] EXHAUST GAS LIQUID CONTACTOR

[75] Inventor: Kunio Terao, Kanagawa, Japan

[73] Assignee: Okamura Manufacturing Company Limited, Yokohama, Japan

[22] Filed: Apr. 8, 1974

[21] Appl. No.: 458,888

Related U.S. Application Data

[63] Continuation of Ser. No. 186,677, Oct. 5, 1971, abandoned.

[52] U.S. Cl. ................................. 55/222; 55/239; 55/255; 55/248; 55/259; 55/DIG. 30; 60/310; 261/79 A; 261/119 R
[51] Int. Cl.² ....................................... B01D 47/02
[58] Field of Search .............. 55/95, 84, 235–259, 55/DIG. 30, 222; 60/310; 261/79 A, 119 R

[56] References Cited
UNITED STATES PATENTS

| | | | |
|---|---|---|---|
| 1,022,496 | 4/1912 | Muller et al. | 55/259 |
| 2,579,282 | 12/1951 | Vicard | 55/94 |
| 3,561,194 | 2/1971 | Baldwin et al. | 55/249 |
| 3,642,259 | 2/1972 | Bowden | 55/250 |
| 3,695,005 | 10/1972 | Yuzawa | 55/255 |
| 3,755,990 | 9/1973 | Hardison | 55/240 |

FOREIGN PATENTS OR APPLICATIONS

| | | | |
|---|---|---|---|
| 429,692 | 5/1911 | France | 55/255 |
| 881,873 | 2/1943 | France | 55/255 |
| 857,105 | 4/1940 | France | 55/237 |

*Primary Examiner*—Bernard Nozick
*Attorney, Agent, or Firm*—Lackenbach, Lilling & Siegel

[57] ABSTRACT

This invention provides an exhaust gas cleaner comprising apparatus for removing particulate matter from hot exhaust gases, the particulate matter being too fine to be removed from the exhaust gas directly by the filter in the apparatus. The apparatus in accordance with this invention comprises water-exhaust gas contact means, wherein water vapor is added to the exhaust gas, cooling means for cooling the exhaust gas and causing condensation of the water vapor in the exhaust gas as water droplets surrounding the fine particles, and filter means for removing the water droplets from the exhaust gas, thereby simultaneously removing the fine solid particles.

1 Claim, 6 Drawing Figures

EXHAUST GAS LIQUID CONTACTOR

This is a continuation of application Ser. No. 186,677 filed Oct. 5, and now abandoned.

Exhaust gas released from an internal combustion engine or the like contains the extremely fine particles such as carbon particles. It is extremely difficult, if not impossible, to perfectly capture such fine particles with an ordinary filter. Further, such ordinary filter causes loading in a short time and also invites rise of back pressure of exhaust gas, so that it is subject to restriction in practical use.

The present invention has for its object to provide a device for highly effectively purifying exhaust gas by forming the water droplets so that each of said droplets encloses therein as its nucleus each or group of the fine particles contained in exhaust gas, each said water droplet being several to several ten times the particle nucleus in diameter.

More particularly, the invention relates to an exhaust gas cleaner characterized in that a large quantity of vapor is generated by utilizing high temperature and kinetic energy of exhaust gas and the produced vapor is mixed into exhaust gas and cooled to bring the mixture into an oversaturated state whereby to produce the water droplets each of which has trapped therein as its nucleus one or group of the solid components such as carbon particles in exhaust gas, each said water droplet being several to several ten times as large as the nucleus itself in diameter, and then these water droplets, with the harmful solid components trapped therein, are effectively captured by a filter, thereby to purify exhaust gas so that only the cleaned gas, which does not contain the solid components such as dust, is released into the atmosphere.

Figure 2:
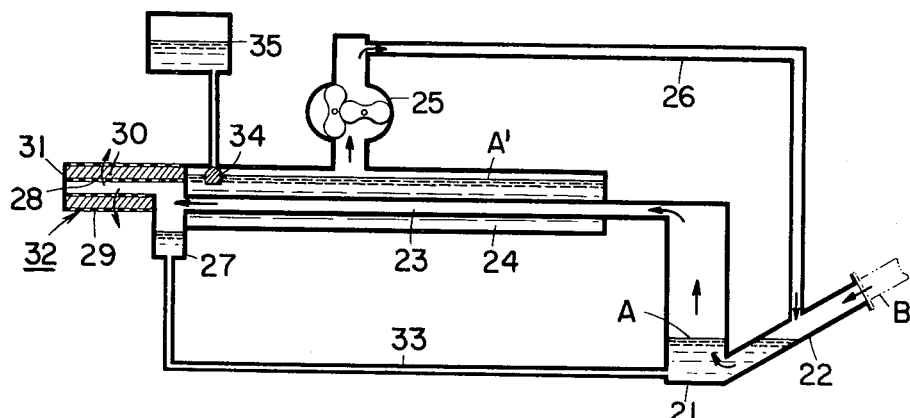
Figure 3A:
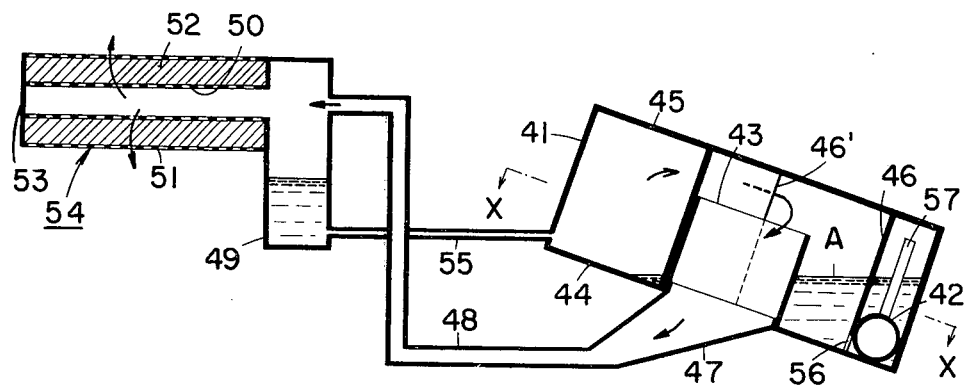
Figure 3B:
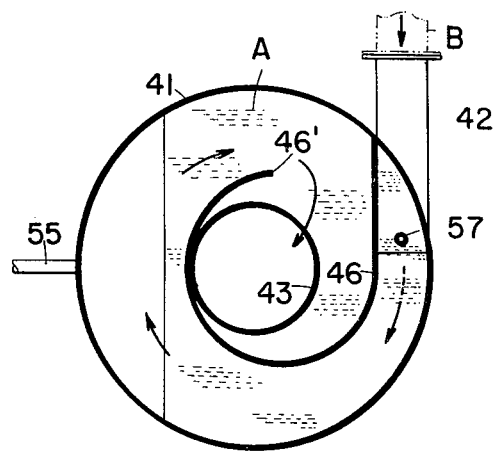

These and other objects, features and advantages of the present invention will become more apparent as the invention is more fully described hereinafter by way of its preferred embodiments in conjunction with the accompanying drawings, in which:

FIGS. 1 to 5 are longitudinal sectional front views diagrammatically illustrating the different forms of embodiments of the present invention, where FIG. 3b is a cross-sectional view taken along the line X—X of FIG. 3a.

Referring first to FIG. 1, there is shown a first embodiment of the present invention having an arrangement as described hereunder.

As will be seen, there is provided a water tank 1 having a rear wall 2 and a front wall 3, and an exhaust pipe B from an internal combustion engine and a cooling pipe 4 are connected to the bottom parts of said rear wall 2 and front wall 3, respectively. The cooling pipe 4 comprises along a portion of its length a diffusing cone, as shown in FIG. 1, along the portion immediately upstream of the filter assembly 16. At a middle part of the bottom wall 5 of the water tank 1 is erected a vertical partition plate 6 of which the top end 6' is positioned slightly below the top wall 7.

It will be also seen that baffle plates 8 and 9 having a height less than ½ of the interior height of the water tank 1 are provided vertically at a part of the bottom wall 5 of the water tank, located slightly forward of the junction with the exhaust pipe B, and at a part of the top wall 7 located slightly rearward of the partition plate 6, respectively. In the space defined between the rear wall 2 of the water tank 1 and the partition plate 6 is contained water A such that its surface level always stays between the top end 8' of the baffle plate 8 and the bottom end 9' of the baffle plate 9. The front end of the cooling pipe 4 is connected to an inner cylinder 12 of a filter assembly 16 which consists of said inner cylinder 12 and an outer cylinder 13 having the holes 10 and 11, respectively, with a filter medium 14 being stuffed between said both cylinders, and which is closed at its front end by a cover plate 15.

Also in FIG. 1, numeral 17 denotes a by-pass pipe communicating a top part of the water tank 1 with the exhaust pipe B to prevent back flow of water A in the water tank 1 into the exhaust pipe B. The baffle plate 8 is provided with a plurality of through-holes 18.

In operation of this device, when exhaust gas is guided through the exhaust pipe B into water A in the water tank 1, the large-sized ones of the particles such as carbon particles contained in exhaust gas are separated and deposited on the bottom of the water tank 1. Upon contacted with exhaust gas, water in the water tank 1 is heated to produce a large quantity of vapor, and exhaust gas is mixed with vapor thus produced and rises up in the water tank 1. Owing to the presence of the baffle plate 9, partition plate 6 and front wall 3 of the tank 1, the flowing direction of vapor-mixed exhaust gas is changed vertically, and finally it reaches the cooling pipe 4 and is cooled therein. If vapor-containing exhaust gas is cooled below the dew point, vapor is brought into an oversaturated state and liquefied. Since this liquefaction takes place with the solid components in exhaust gas serving as nuclea, the size of each water droplet formed thereby amounts to several to several ten times that of the nucleus thereof. Therefore, when exhaust gas containing such large-sized water droplets passes the filter 16, said water droplets in exhaust gas are entirely captured by the filter and removed out of exhaust gas. Of course, the solid components, which are nuclea of said water droplets, are also eliminated. Thus, it will be appreciated that only purified gas, which has been cleared of even extremely fine solid components, is discharged from the filter assembly 16.

In FIG. 2 there is shown a second embodiment of the present invention where additional improvements are made to further increase the cooling effect as compared with the first embodiment and to prevent rise of back pressure of exhaust gas.

At a bottom part on one side of a water tank 21 is connected an inlet pipe 22 which extends aslant upwardly, and at an upper part on the other side of said tank 1 is connected a cooling pipe 23 which extends horizontally. The cooling pipe 23 is enclosed with a sealed water pipe 24, the latter having connected to its suitable upper part a Roots-blower or pressure-reducing pump 25 such as vacuum pump of which the outlet is connected through a conduit 26 into a suitable part of said inlet pipe 22 in the direction where exhaust gas is discharged. The front end of the cooling pipe 23 is connected to an upper part on one side of a water receiver 27 of which an upper part on the other side is communicated with an inner hole of a cylindrical filter assembly 32 which consists of a porous inner cylinder 28 and an outer cylinder 29, with polyurethane foam 30 being stuffed therebetween, and which is closed at its front end 31. The bottom of said water receiver 27 is connected through a connecting pipe 33 to the bottom of the water tank 21, and the upper side of the interior of the water pipe 24 is connected through a float valve 34 to a water reservoir 35 positioned thereabove.

Now, the operation of the present device will be described. The terminal end of the exhaust pipe B from an internal combustion engine is connected to the inlet pipe 22 and a suitable amount of water A, A' is fed into the water tank 21 and water pipe 24, respectively. Then the pressure-reducing pump 25 is operated to reduce air pressure in the water pipe 24 and then the internal combustion engine is operated. Thereupon, exhaust gas is forced into water A in the water tank 21, whereby the large-sized solid components in exahust gas are removed and at the same time a large quantity of vapor is generated, with thus generated vapor being guided into the cooling pipe 23. While passing through the cooling pipe 23, said vapor is cooled and brought into a saturated state to form water droplets trapping therein as nuclea the fine particles such as carbon particles which have remained in exhaust gas. These water droplets are caught in the polyurethane foam 30 in the filter assembly 32 and only the cleaned gas is released to the atmosphere. In this embodiment, as in the preceding one, the water droplet catching or capturing rate is extremely high and hence a markedly elevated exhaust gas purifying efficiency is obtained.

Thus, since the cooling pipe 23 is enclosed with the sealed water pipe 24, with the air pressure in said water pipe 24 being always kept lower than the atmospheric pressure by the pressure-reducing pump 25, water A' in the water pipe 24 is compulsively evaporated at a low temperature, thus producing a large cooling effect. The vapor thus produced is guided through the conduit 26 into the inlet pipe 22 and mixed with exhaust gas therein to prevent rise of back pressure of exhaust gas. The water droplets captured in the filter assembly 32 are flown down into and reservoired in the water receiver 27 whence collected water is guided through the conduit 33 back to the water tank 21.

Referring now to FIG. 3a and FIG. 3b, there is shown a third embodiment of the present invention where centrifugal force is produced by exhaust gas so as to obtain even better purifying effect by utilizing such centrifugal force. As will be seen, an inlet pipe 42 is provided extending tangentially from a part at the lower portion of an outer casing 41 which is substantially circular in shape and slightly slanted relative to the horizontal line as shown. In the center of said outer casing 41 is erected an inner cylinder 43 which is slightly lower in height than the outer casing 41, with the bottom end of said inner cylinder 43 being opened in the bottom plate 44. At the inside end of said inlet pipe 42 which is located within the outer casing 41 is secured a three-quarter-arc-shaped air guide plate 46 which extends toward the outside face of the inner cylinder 43 and which is gradually diminished in curvature, with its both upper and lower edges being in contact with the top plate 45 and the bottom plate 44, respectively, of the outer casing 41. The open bottom of the inner cylinder 43 is connected through a connecting pipe 47 to a cooling pipe 48 whose other end is connected to an upper part on one side of a water receiver 49. An upper part on the other side of said water receiver 49 is communicated with an inner hole in a cylindrical filter assembly 54 which consists of a porous inner cylinder 50 and an outer cylinder 51, with polyurethane foam 52 being stuffed between said both cylinders, and which is closed at its end 53.

The bottom of the water receiver 49 is connected through a conduit 55 into the inside of the outer casing 41. At a part of the air guide plate 46 which is close to the inlet pipe 42, there are formed a suitable number of apertures 56. Numeral 57 denotes a vent pipe which extends uprightly from a suitable part of the inlet pipe 42 and is opened at its top end near the top plate 45 of the outer casing 41.

In operation of this embodiment, an exhaust pipe B from an internal combustion engine is connected to the end of the inlet pipe 42, then a suitable amount of water A is supplied into the outer casing 41 and the internal combustion engine is operated, whereby exhaust gas from said engine is discharged into water A in the outer casing 41 and the large-sized solid components contained in said exhaust gas are removed. At the same time, water is slashed upwardly in the interior of the outer casing 41 by kinetic energy of exhaust gas itself. Therefore, exhaust gas emerging from water A is caused to flow circularly in the interior of the outer casing 41 and sufficiently mixed with the water slashed while undergoing heat exchange therewith to thereby convert the fine water splashes into vapor.

In this case, the comparatively large-sized water drops which were not vaporized are separated by centrifugal force when they move along the interior surface of the outer casing 41 and drop to the bottom of the outer casing 41, so that vapor and exhaust gas alone pass over the fore edge 46' of the air guide plate 46 and are guided into the inner cylinder 43. The vapor, when passing through the cooling pipe 48, is cooled and oversaturated, thus forming the water droplets collected around the fine particles such as carbons remaining in exhaust gas. These water droplets, with the fine particles trapped therein, are caught by the polyurethane foam 52 in the filter assembly 54, allowing only the particle-free, cleaned gas to pass into the atmosphere. Since these water droplets are far larger in diameter than the solid components such as carbon particles in exhaust gas, their rate of being caught is extremely high and, hence, an amazingly high exhaust gas purifying efficiency is obtained.

As will be obvious, the water droplets caught in the filter assembly 54 are received in a water receiver 49 whence the water collected therein is guided through a conduit 55 back into the outer casing 41. The vent pipe 57 functions to prevent back flow of water A to the internal combustion engine at the time of reversion of the engine.

Thus, according to this embodiment, water A in the outer casing 41 is slashed in the form of water droplets in the interior of the casing 41 by the energy of exhaust gas, and also the large-sized water droplets are separated away by the centrifugal force, with the small-sized droplets being sufficiently mixed up with exhaust gas and effectively vaporized by the heat of said gas, allowing only the mixture of exhuast gas and vapor to be guided into the cooling pipe 48, so that said cooling pipe is always kept free from stagnation of water droplets and therefore a highly efficient purifying efficiency is obtained.

Figure 4:
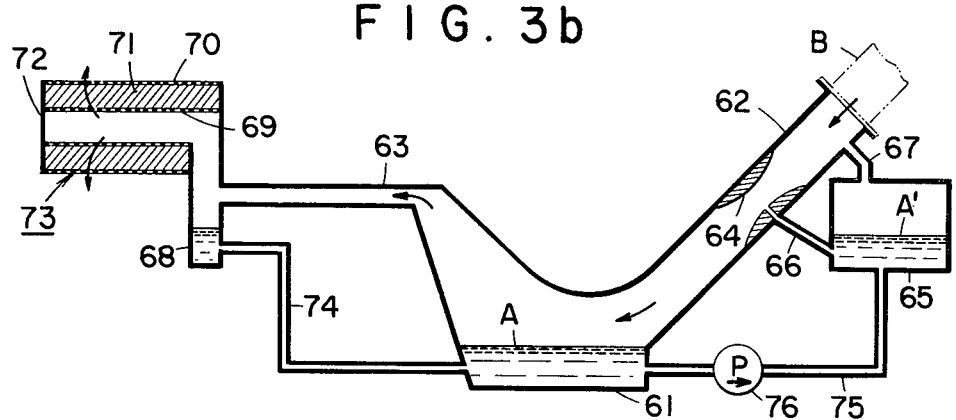

In FIG. 4 there is shown a fourth embodiment of the present invention where water is ejected into exhaust gas to thereby produce vapor. It will be seen that an inlet pipe 62 extending aslant upwardly is connected to an upper part on one side of a water tank 61 and a horizontal cooling pipe 63 is connected to an upper part on the opposite side of said tank 61. At a suitable location in the inside of said inlet pipe 62 is provided a narrowed portion or neck 64, and in the smallest diameter portion of said neck is opened an end of a fine pipe 66 extending from a part near the bottom of sealed type water tank 65. Also extending from an upper part of said tank 65 is a vent pipe 67 which is opened into the inlet pipe 62 at a suitable location above the neck 64 as shown. The upper end of the inlet pipe 62 is connected to the terminal end of an exhaust pipe B from an internal combustion engine. The outer end of the cooling pipe 63 is connected to an upper part on one side of a water receiver 68, and the top of said water receiver 68 is communicated with an inner hole in a cylindrical filter assembly 73 which consists of a porous inner cylinder 69 and an outer cylinder 70, with polyurethane foam 71 being stuffed between said both cylinders, and which is closed at its front end 72. The bottoms of said water receiver 68 and water tank 61 and the bottoms of said water tank 61 and sealed type water tank 65 are connected with each other through conduits 74 and 75, respectively, and halfway of said conduit 75 is provided a pump 76 arranged such that its discharge side is directed toward the sealed type water tank 65.

In operation of this embodiment, water is fed into the water tanks 61 and 65 in a suitable amount such as to leave a space in the upper part of each said tank, and then the internal combustion engine is operated. Exhaust gas discharged from the exhaust pipe B into the inlet pipe 62 is reduced in pressure at the neck 64 by the Venturi effect. Consequently, pressure in the fine pipe 66 is considerably reduced as compared with pressure in the vent pipe 67, and this causes water A' in the sealed water tank 65 to gush out in the form of sprays into the inlet pipe 62 through the fine pipe 66. The water thus sprayed into the inlet pipe 62 is quickly vaporized by heat of exhaust gas, with the superflous portion of water being guided down into and reservoired in the water tank 61. The vapor thus produced is cooled and oversaturated when passing through the cooling pipe 63 and forms the water droplets collected around the fine particles such as carbon particles in exhaust gas. These water droplets are caught in the polyurethane foam 71 in the filter 73 and only the cleaned gas is released into the atmosphere.

Since these water droplets are several to several ten times as large in diameter as the solid components such as carbon particles in exhaust gas, their capture rate is extremely high and, accordingly, the gas purifying efficiency is splendid. Further, rise of back pressure is minimized.

Those water droplets which were discharged from the fine pipe 66 but not vaporized, or those formed by cooling, drop into the tank 61 or water receiver 68 and are reservoired therein. The pump 76, which may or may not be provided as occasion demands, is adapted to supply or replenish water into the sealed type water tank 65 and to pressurize the interior of said tank to facilitate water ejection therefrom.

Figure 5:
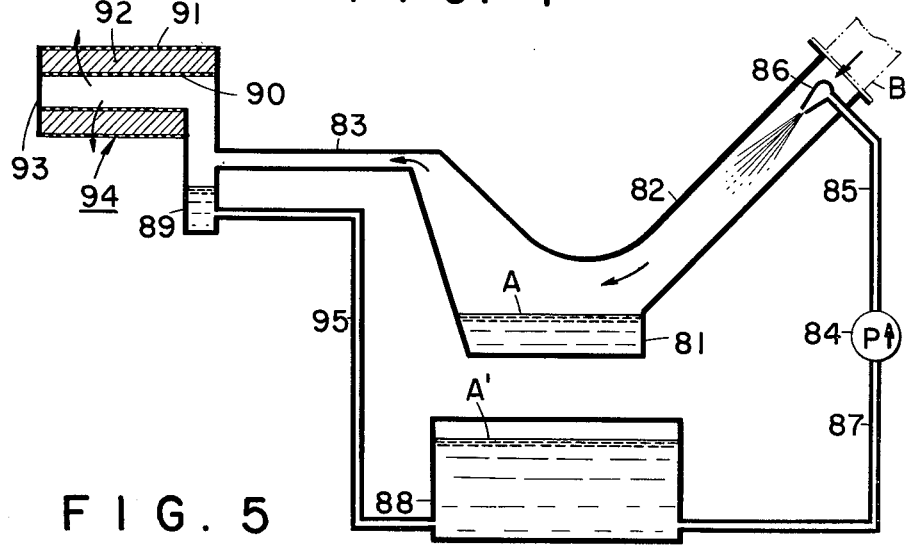

In FIG. 5 is shown a fifth embodiment of the present invention. At an upper part on one side of a first water tank 81 is connected an inlet pipe 82 extending aslant upwardly, and at an upper part on the other side of said tank is connected a cooling pipe 83 extending horizontally. An end of a fine pipe 85 extending from the discharge side of a pump 84 is projected into the inlet pipe 82, and the nozzle-like open end portion 86 of said pipe 85 is directed backwardly, that is, towards the water tank 81. The intake side of the pump 84 is connected through a conduit 87 to the bottom of a second water tank 88. At the upper end of the inlet pipe 82 is connected the terminal end of an exhaust pipe B from an internal combustion engine. The end of the cooling pipe 83 is connected to an upper part on one side of a water receiver 89 of which the other side is communicated with an inner hole in a cylindrical filter 94 which consists of a porous inner cylinder 90 and an outer cylinder 91, with polyurethane foam 92 being packed between said both cylinders, and which is closed at its front end 93. The bottom of the water receiver 89 is connected through a conduit 95 to the bottom of the second water tank 88.

In operation of this embodiment, a suitable amount of water is supplied to the first and second water tanks 81 and 82, respectively, and then the internal combustion engine is operated. When the pump 84 is operated, water is ejected from the open end 86 of the fine pipe 85 toward the first water tank 81. In this case, water is turned into the form of fine particles owing to kinetic energy of exhaust gas and pressure-reducing action produced by the presence of the backwardly directed open end 86 of the fine pipe 85. Also, water is rapidly vaporized by heat of exhaust gas, with the remaining (that is, non-vaporized) water being dropped into and reservoired in the first water tank 81.

The vapor thus produced is cooled and oversaturated when passing through the cooling pipe 83 and forms the water droplets collected around the fine particles such as carbon particles in exhaust gas. These water droplets, with the fine particles being trapped therein, are caught by the polyurethane foam 92 in the filter 94 and only the purified gas is released into the atmosphere. As in the preceding embodiments, the capture rate of these water droplets is extremely high and therefore an amazingly high purifying efficiency is obtained. Further, rise of back pressure is confined to the minimum. Those water droplets which were not vaporized after having been discharged from the fine pipe 85, or those formed by cooling, are collected and reservoired in the first water tank 81 or the water receiver 89.

According to this embodiment, resistance encountered during the discharging operation is very small. Therefore, discharge of exhaust gas can be positively expedited by suitably selecting the capacity of the pump 84 and the size and position of the open end portion 86 of the fine pipe 85, whereby it is possible to still enhance the combustion efficiency of the internal combustion engine.

I claim:

1. Apparatus for cleaning exhaust gas containing pollutants in the form of suspended particulate solid particles comprising in combination:
    1. A tank having an inlet and an outlet, said tank comprising a substantially circular outer casing, said gas inlet pipe being tangentially connected to the lower portion of said tank; an inner cylinder erected in the center of said outer casing, said inner cylinder being slightly lower in height than said casing, and an arc-shaped air guide plate extending from an inside end of said gas inlet pipe in the outer casing to the outer peripheral face of said inner cylinder, and the bottom end of said inner cylinder being connected to the cooling means;

2. A gas inlet pipe connected to said tank and adapted to be connected to a source of heated gas containing pollutants;
3. A body of liquid within said tank, said gas inlet pipe being arranged relative to said body of liquid to insure gas-liquid contact to cause vaporization of said liquid and to form an intimate mixture of hot gas and liquid vapor;
4. An elongate gas outlet pipe, connected at one end thereof to said tank outlet, said outlet pipe having a length selected to make the said suitable to cool said mixture below the dew point of the liquid vapor so as to form droplets of liquid in the gas, the solid particulate material suspended in the gas serving as nuclei for the formation of such droplets; and
5. A filter connected to the other end of said elongate gas outlet pipe remote from said tank, said filter being adapted for separating the liquid droplets from the gas, whereby the solid particles, which would otherwise be too fine to be removed directly from the gas, are retained by the filter as the nuclei of the relatively larger liquid droplets, so that undesirable particulate material can be readily removed from an exhaust gas prior to discharge to the atmosphere.

* * * * *